ns Patent Office 3,562,314
Patented Feb. 9, 1971

3,562,314
PRODUCTION OF 2,7-OCTADIENYL
CARBOXYLATES
Thomas M. Shryne, 60 Los Cerros,
Walnut Creek, Calif. 94598
No Drawing. Filed Dec. 27, 1966, Ser. No. 604,592
Int. Cl. C07c 69/14, 69/44, 69/54
U.S. Cl. 260—485   7 Claims

ABSTRACT OF THE DISCLOSURE 2,7-octadienyl esters of organic mono- and dicarboxylic acids are produced by a dimerization-addition reaction of carboxylic acid with 1,3-butadiene in the presence of a palladium carboxylate, preferably palladium acetate, as the catalyst and in the absence of catalyst promoter. The 2,7-octadienyl carboxylate monoesters are useful as boundary modifiers in lubricating oil compositions and the diesters are useful as plasticizers for resins.

PRIOR ART

Methods are available in the art for the dimerization of conjugated dienes under conditions whereby a derivative of the diene dimer is observed. In general, such methods produce a diene dimer moiety which is branched; for example, from the dimerization of butadiene is typically obtained a methylheptadiene moiety as the principal acyclic product type. In copending application of E. J. Smutny, U.S. Ser. No. 455,978, filed May 14, 1965, now U.S. 3,407,224 diene dimer derivatives wherein the diene moieties have dimerized in a linear manner have been obtained utilizing palladium-, platinum-, or ruthenium-containing catalyst and a phenoxide anion catalyst promoter. Although the metal-containing compound alone may serve as a catalyst therein, the activity of the metal compound is greatly enhanced by the presenec within the reaction system of a phenoxide anion catalyst promoter and the disclosed preferred metal-containing catalyst, palladium chloride, used alone does not produce the diene dimer products in sufficient yield to effect a feasibly practical preparative route therefor.

Therefore, it was surprising to find that certain 2,7-octadienyl carboxylate esters of organic carboxylic acids are produced in effective yield by reacting organic carboxylic acids with butadiene in the presence of a palladium salt of a lower unsubstituted monocarboxylic acid of 2 to 7 carbon atoms, preferably acetic acid, as catalyst and in the absence of catalyst promoter. Whereas before, in the process of U.S. Ser. No. 455,978 with palladium halide as catalyst, it was necessary to modify the catalyst with phenoxide anion catalyst promoter, now in the process of the present invention, when palladium carboxylate, i.e. palladium acetate, is used instead of palladium halide, phenoxide anion as broadly defined in U.S. Ser. No. 455,978 is not required. In the present invention the process is carried out in a system essentially free from phenoxide anions and substantially free from halides and in this manner has advanced the art beyond the process of U.S. Ser. No. 455,978. In general, the process of the present invention is carried out free of noncarboxylate organic ions, e.g. phenoxide anions, and substantially free of halides, e.g. chloride. Although the mechanism of the condensation process is not completely understood, the process of the invention results in the efficient production of esters, the acid moiety of which is derived from the organic carboxylic acid reactant and the alcohol moiety of which may be considered as derived from a dimer of the butadiene reactant. By way of illustration, from the reaction of acetic acid and butadiene in the process of the invention is obtained 1-acetoxy-2,7-octadiene, alternatively termed 2,7-octadienyl acetate.

REACTANTS

Employed as one of the reactants in the process of the invention is 1,3-butadiene. Closely related materials such as isoprene are essentially nonreactive in the system described herein.

The process is suitably employed with organic carboxylic acids of from 2 to 10 carbon atoms and having from 1 to 2 carboxy groups, with the proviso that the carboxy groups are bonded to noncarboxy carbon, present within the molecular structure and having no active hydrogen atoms other than that (those) of the carboxy group(s). The organic carboxylic acid reacant is suitably wholly aliphatic in character, wholly aromatic in character or incorporates both aliphatic and aromatic moieties. It may be saturated or unsaturated with either aromatic or aliphatic carbon-carbon unsaturation. The carboxylic acid reactant is a hydrocarbon carboxylic acid containing only atoms of carbon and hydrogen besides the oxygens of the carboxy group(s) present, or is a substituted-hydrocarbon carboxylic acid containing, in addition to atoms of carbon, hydrogen and carboxy oxygen, oxygen atoms other than carboxy oxygen atoms, which additional atoms are present in functional groups such as oxy, carbonyloxy, and the like.

Illustrative of suitable carboxylic acid reactants are wholly aliphatic carboxylic acids including hydrocarbon aliphatic carboxylic acids, both acyclic and cyclic, such as acetic acid, propionic acid, butyric acid, methacrylic acid, pivalic acid, hexanoic acid, 2-ethylhexanoic acid, decanoic acid, glutaric acid, adipic acid, 2-methylglutaric acid, cyclopentanecarboxylic acid, tetrahydronaphthalene-1-carboxylic acid, cyclohexane - 1,4 - dicarboxylic acid, and 1,4-bis(carboxymethyl)cyclohexane; as well as substituted-hydrocarbon aliphatic carboxylic acids, both acyclic and cyclic, as exemplified by 3-acetoxypropionic acid, 2-ethoxyethanoic acid, tetrahydropyran-2-carboxylic acid and bis(2-carboxyethyl) ether.

Also suitable are carboxylic acid reactants which are wholly aromatic in character, as illustrated by hydrocarbon aromatic carboxylic acids such as benzoic acid, terephthalic acid, naphthalene-1-carboxylic acid, naphthalene-1,4-dicarboxylic acid and the like.

Carboxylic acids having both aromatic and aliphatic moieties are also suitably employed as reactants in the process of the invention. Such acids are exemplified by hydrocarbon carboxylic acids including phenylacetic acid, p-tert-butylbenzoic acid, m-toluic acid, tetrahydronaphthalene-2-carboxylic acid, 3,5 - dimethylbenzoic acid and 5-methylisophthalic acid; as well as by substituted-hydrocarbon carboxylic acids, for example, 3-phenoxypropionic acid, m-methoxybenzoic acid, p-ethoxybenzoic acid and the like.

The process of the invention is particularly useful when monocarboxylic acids are employed, particularly hydrocarbon monocarboxylic acids of up to 6 carbon atoms. The class of lower aliphatic mono- and dicarboxylic acids comprising acetic acid, methacrylic acid and adipic acid is particularly preferred.

The optimum ratio of carboxylic acid reactant to butadiene reactant will depend in part upon the functionality of the carboxylic acid reactant, that is, the number of carboxy groups present in the carboxylic acid reactant molecule, as well as the reactant conversion that is desired. Ratios of moles of butadiene to moles of carboxy group as low as about 1:4 are suitable if only a low conversion is employed. However, to obtain higher conversions, a more substantial proportion of butadiene is preferred and ratios of moles of butadiene to moles of carboxy group from about 1:1 to about 10:1 are more satisfactory, with best results being obtained when ratios of moles of butadiene to moles of carboxy group from about 2:1 to about 6:1 are utilized. It should be understood that it is within the contemplated scope of the invention to esterfy each carboxy group of the carboxylic acid reactant or only a portion of the total number of carboxy groups. In the latter instance, such restrictive esterification is favored by a molar reactant ratio relatively low in the butadiene reactant.

The catalyst employed in the process of the invention is preferably palladium acetate. The process of the invention is characterized by the requirement that the catalyst be employed essentially free of phenoxide anion and substantially free of halide. By substantially free of halide is meant halide concentration relative to palladium concentration. The process can tolerate a small quantity of halide, e.g., up to 10 stoichiometric percent of chloride, bromide or iodide, associated with the palladium. The process of the invention is characterized also by the requirement for only catalytic quantities of palladium acetate. Although utilization of larger amounts of palladium acetate catalyst is not detrimental to the process of the invention, amounts larger than about 1 mole percent based on total reactants are not generally required. Amounts of palladium acetate less than about 0.001 mole percent on the same basis are generally unsuitable because of the inevitable physical losses of catalyst during reaction and processing. In general, amounts of catalyst from about 0.01 mole percent to about 0.5 mole percent based on total reactants are satisfactory and are preferred.

The process of the invention is typically conducted by charging the reactants and catalyst to an autoclave or similar reactor and maintaining the reaction mixture at reaction temperature until reaction is complete. The method of mixing is not critical although it is generally preferred to mix the reactants and add the catalyst thereto. The reaction is suitably conducted throughout a wide range of reaction temperatures and pressures, so long as the reactants are maintained substantially in the liquid phase. Reaction temperatures from about $-20°$ C. to about $150°$ C. are satisfactory, although temperatures from about $0°$ C. to about $120°$ C. are preferred and best results are obtained when a temperature from about $25°$ C. to about $90°$ C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. Solvents that are suitable are those capable of dissolving the reactants and catalyst, and are inert to the reactants and the products, thus in general being free from active hydrogen. Examplary solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides and N-alkyl lactams, e.g. dimethylformamide, N,N-dimethylacetamide, N,N-diethylacetamide and N-methylpyrrolidinone; halogenated hydrocarbons such as chloroform, carbon tetrachloride, tetrachloroethylene, methylene chloride and bromoform; sulfoxides such as dimethyl sulfoxide; and nitriles such as acetonitrile and benzonitrile. The solvent, if any, is employed in a wide range of molar amount and from about ⅓ mole of solvent up to about 150 moles per mole of total reactants are satisfactory; in general a molar excess over the amount of total reactants is preferred. For convenience, it is generally preferable to conduct the reaction in the absence of added solvent whenever the physical characteristics of the system at reaction temperature, particularly the melting point thereof, will allow. For example, when the process of the invention is employed with a reaction mixture normally liquid at reaction temperature, the process is typically conducted in the absence of solvent. Alternatively, if the reaction mixture is unduly viscous or normally solid at the reaction temperature, solvent is preferably employed to maintain the reactants in the liquid phase.

Subsequent to reaction, the reaction mixture is separated and the desired product recovered by conventional means such as selective extraction, fractional distillation and chromatographic techniques.

The products of the invention are certain alkadienyl carboxylate esters illustratively produced by dimerization of the diene reactant and reaction of the diene dimer with the carboxylic acid reactant to esterify at least one of the carboxy groups. In terms of the carboxylic acid reactants as previously defined, the products of the invention are alkadienyl carboxylates wherein the alkadienyl moiety is 2,7-octadienyl, and the carboxylic acid moiety is that moiety illustratively obtained by removal of the hydrogen of at least one carboxy group of a carboxylic acid of 2 to 10 carbon atoms and having from 1 to 2 carboxyl groups. Since butadiene is employed as the diene reactant, the alkadienyl moiety will be 2,7-octadienyl. It is within the contemplated scope of the invention to esterify only a portion of the carboxyl groups present in the carboxylic acid reactant, for example, to esterify only one carboxyl group of a dicarboxylic acid. However, the preferred products of the invention are those wherein each carboxyl group has been esterified with a 2,7-octadienyl moiety.

It will be apparent that a wide variety of 2,7-octadienyl carboxylates can be prepared by the process of the present invention by varying the carboxylic acid. Illustrative of these products are 2,7-octadienyl acetate prepared from acetic acid and butadiene, 2,7-octadienyl pivalate prepared from pivalic acid and butadiene, 2,7-octadienyl methacrylate prepared from butadiene and methacrylic acid, as well as other illustrative products such as 2,7-octadienyl hexanoate, bis(2,7-octadienyl) adipate, bis(2,7-octadienyl) terephthalate, bis(2,7-octadienyl) 2-methylglutarate, 2,7-octadienyl cyclohexane-carboxylate, 2,7-octadienyl 1-naphthoate, 2,7-octadienyl ethoxyethanoate, 2,7-octadienyl 3-carboxypropionate, and 2,7-octadienyl 3-methoxybenzoate.

The products of the invention are useful in a variety of applications. The monoesters, e.g. 2,7-octadienyl hexanoate, are oil-soluble materials useful as boundary modifiers and in lubricating oil compositions. The properties of the monoesters for this purpose can be improved upon by sulfurizing them by reaction with sulfur, phosphorus pentasulfide and the like. The diesters, e.g. bis(2,7-octadienyl) adipate, are useful as plasticizers for resins such as polyvinyl chloride. Esters produced from carboxylic acids of aliphatic carbon-carbon unsaturation, e.g. 2,7-octadienyl methacrylate, can be polymerized through the unsaturation of the acid moiety to produce high-molecular-weight, oil-soluble polymers useful as viscosity index improvers for mineral lubricating oils; for example, a minor amount of 0.5 to 5% by weight of the polymer dissolved in the oil is effective therefor. By virtue of the aliphatic unsaturation in the alcohol moiety, i.e. the 2,7-octadienyl chains, of these polyesters, the oil solubility thereof is increased over that of saturated materials used for the same purpose. Additionally the remaining ethylenic linkages of the products of the invention can be hydrated or hydroxylated to form useful alcohol esters. The ethylenic linkage serves as a dienophile in Diels-Alder condensations and also is epoxidized to form epoxy compounds from which useful epoxy resins are prepared by reaction with a variety of epoxy curing agents. The ester products are hydrolyzed to form allylic alcohol, i.e. 2,7-octadienol, from which ethers, sulfates, sulfonates and the like are prepared.

In the following examples, the relationship of volume to weight is in the same relationship as that of milliliters to grams.

EXAMPLE I

To a stainless-steel bomb were charged 3.3 parts by volume (0.058 mole) of acetic acid, 10 parts by volume (0.12 mole) of butadiene, and 0.011 part by weight (0.00005 mole) of palladium acetate as catalyst. The bomb was sealed and maintained at 25° C. for 16 hours. The bomb was then chilled and the product mixture removed and filtered. Gas-liquid chromatographic (GLC) analysis of the product mixture indicated a conversion of 26% based on acetic acid charged with a selectivity of 93% to 2,7-octadienyl acetate.

EXAMPLE II

To a glass bomb tube were charged 3.3 parts by volume (0.058 mole) of acetic acid, 10 parts by volume (0.12 mole) of butadiene, and 0.02 part by weight (0.0001 mole) of palladium acetate [$Pd(OOCCH_3)_2$]. The bomb was sealed and maintained at 70° C. for 12 hours. The bomb was then cooled and the product mixture removed and filtered. GLC analysis of the product mixture indicated a conversion of 21% based on acetic acid charged with a selectivity of 92% to 2,7-octadienyl acetate.

For purposes of comparison the above experiment was repeated with 0.0001 mole of palladium chloride ($PdCl_2$) substituted for palladium acetate; a conversion of <0.5% was obtained. Another run with 0.0001 mole of π-allylpalladium chloride ($\pi C_3H_5PdCl$) substituted for palladium acetate resulted in a conversion of 0.5%.

EXAMPLE III

To a glass bomb tube were charged 33 parts by volume (0.58 mole) of acetic acid, 0.1 part by weight (0.0005 mole) of palladium acetate, and 45 parts by volume of dimethyl sulfoxide as solvent. The bomb was chilled in a Dry Ice-acetone bath and about 100 parts by volume (1.2 moles) of butadiene was condensed in the bomb. The bomb was sealed and placed in an oil bath maintained at 70° C. for 18 hours. The bomb was then cooled and the product mixture removed and filtered. The depleted catalyst was deposited as a palladium mirror. A water wash of the product mixture was required to remove all of the dimethyl sulfoxide. GLC analysis of the washed product mixture indicated a conversion of 84% based on acetic acid charged with a selectivity of 92% to 2,7-octadienyl acetate, which was recovered by fractional distillation at reduced pressure of about 20 mm. Hg.

EXAMPLE IV

A series of experiments was conducted in accordance with the method of Example III utilizing various solvents. No washing step was required to remove these solvents. The results of this series are shown in Table I.

TABLE 1

| Solvent: | Conversion, percent | Selectivity to 2,7-octadienyl acetate, percent |
|---|---|---|
| Acetonitrile | 16 | 99 |
| n-Hexane | 22 | 74 |
| Benzene | 29 | 90 |
| Acetone | 24 | 96 |
| Tetrahydrofuran | 25 | 70 |
| N,N-dimethylacetamide | 79 | 90 |

EXAMPLE V

To a stainless-steel bomb were charged 3.3 parts by volume (0.058 mole) acetic acid, 15 parts by volume (0.172 mole) of butadiene, 0.02 part by weight (0.0001 mole) of palladium acetate, and 5 parts by volume of N,N-dimethylacetamide as solvent. The bomb was sealed and maintained at 90° C. for six hours. The bomb was then cooled and the product mixture removed and filtered. GLC analysis of the product mixture indicated a conversion of 45% based on acetic acid charged with a selectivity of 90% to 2,7-octadienyl acetate.

EXAMPLE VI

A series of experiments was conducted using various carboxylic acids for the dimerization-addition reaction of butadiene and acid to produce 2,7-octadienyl carboxylates. In each case 0.058 mole of carboxylic acid, 10 parts by volume (0.12 mole) of butadiene, 0.02 part by weight (0.0001 mole) of palladium acetate, and 5 parts by volume of solvent were charged to a glass bomb tube. The bomb was sealed and placed in an oil bath maintained at 70° C. for the indicated period of time. The bomb was then cooled and the product mixture removed, filtered, and analyzed by GLC to determine the conversion based on carboxylic acid charged to 2,7-octadenyl carboxylate ester. The conditions and results of this series are shown in Table 2.

TABLE 2

| Carboxylic acid | Solvent | Time, hrs. | Conversion, percent | 2,7-octadienyl carboxylate ester product |
|---|---|---|---|---|
| $(CH_3)_3CCOOH$ | N,N-dimethylacetamide | 96 | 81 | 2,7-octadienyl pivalate. |
| $C_6H_5COOH$ | Dimethyl sulfoxide | 18 | >40 | 2,7-octadienyl benzoate. |
| $CH_3CH_2COOH$ | Dimethyl sulfoxide | 18 | 60 | 2,7-octadienyl propionate. |
| $CH_2=C(CH_3)COOH$ | Dimethyl sulfoxide | 18 | 79 | 2,7-octadienyl methacrylate. |

I claim as my invention:

1. The process of producing 2,7-octadienyl carboxylate esters by contacting hydrocarbon carboxylic acid selected from the group consisting of acetic, adipic, benzoic, methacrylic, pivalic, and propionic acids with from about 0.25 to about 10 moles per mole of carboxy group of 1,3-butadiene at a temperature from about 0° to about 120° C. and in the presence of palladium acetate essentially free of phenoxide anion and substantially free of halide as catalyst.

2. The process according to claim 1 wherein carboxylic acid reactant is contacted with from about 1 mole to about 10 mole per mole of carboxy group of 1,3-butadiene in the presence of from about 0.001 mole percent to about 1 mole percent based on total reactants of palladium acetate as catalyst.

3. The process according to claim 2 conducted in liquid-phase solution in inert solvent.

4. The process according to claim 2 wherein the 2,7- octadienyl carboxylate ester is bis(2,7-octadienyl) adipate and the carboxylic acid is adipic acid.

5. The process according to claim 2 wherein the 2,7-octadienyl carboxylate is 2,7-octadienyl acetate and the carboxylic acid is acetic acid.

6. The process according to claim 2 wherein the 2,7-octadienyl carboxylate is 2,7-octadienyl methacrylate and the carboxylic acid is methacrylic acid.

7. The process according to claim 2 wherein the 2,7-octadienyl carboxylic ester is 2,7-octadienyl pivalate and the carboxylic acid is pivalic acid.

References Cited

UNITED STATES PATENTS 3,407,224  10/1968  Smutny _____ 260—482

LORRAINE A. WEINBERGER, Primary Examiner

E. J. SKELLY, Assistant Examiner

U.S. Cl. X.R.

260—345.8, 410.9, 468, 469, 473, 475, 476, 484, 486, 497

PO-1050
(5/69)

UNITED STATES PATENT OFFICE
CERTIFICATE OF CORRECTION

Patent No. 3,562,314      Dated February 9, 1971

Inventor(s) THOMAS M. SHRYNE

It is certified that error appears in the above-identified patent and that said Letters Patent are hereby corrected as shown below:

Column 1, line 5, after " Calif. 94598" insert -- , assignor to Shell Oil Company, New York, New York, a Delaware Corporation --.

Signed and sealed this 25th day of May 1971.

(SEAL)
Attest:

EDWARD M. FLETCHER, JR.      WILLIAM E. SCHUYLER, JR.
Attesting Officer      Commissioner of Patents